Patented Aug. 5, 1941

2,251,270

UNITED STATES PATENT OFFICE 2,251,270

CELLULOSIC SHEET MATERIAL AND PROCESS FOR MAKING THE SAME

Emil Czapek, Berlin, Germany, assignor to Guaranty Trust Company of New York, New York, N. Y., a banking corporation of New York No Drawing. Application May 13, 1938, Serial No. 207,809. In Germany January 11, 1937

8 Claims. (Cl. 91—68)

This invention relates to an improved film as a new article of manufacture and the process for making such new film which is perfectly clear and transparent, extremely firm, not brittle, but flexible and is not explosive and not, or only with great difficulty, combustible. The new film is also insoluble in water, vegetable and mineral oils, organic solvents, such as alcohol, keton, hydro-carbon and weak acids, and is also impermeable to the vapors of these liquids.

A feature of the invention resides therein that a thin pellicle or membrane of cellulose hydrate may be used as a base for such films. Such a pellicle has a high tear and crease resistance.

This pellicle is combined with a polymerised heat convertible composition of resins. As such combining agent with the cellulose hydrate structure, the resinous products of urea and formaldehyde are preferably used. Such products are soluble in organic solvents and can be made insoluble through heating. Preferably to these artificial resinous products, there are added artificial resin products which are known as alkyds and which are produced from phtalic anhydrid, glycerine and sebacic oils, such as cocoanut, soya bean, linseed or castor oil and the like.

The latter addition will, of course, depend upon the respective mixture between the urea resin and the alkyd and upon the proportionate content of the alkyd and oil as well as upon the character of the oil selected.

The resins are dissolved in organic solvents, such as benzol, toluol and the like and intimately mixed with each other. If a foil is coated with such a mixture and then heated for a short time, as an instance, a few minutes to a temperature of about one hundred and eighty degrees centigrade or higher, the contents will combine in a chemical way and the coating will become indissoluble in water, oil, organic solvents and the like and will adhere firmly to the supporting base of regenerated cellulose.

The inventive thought here submitted can be carried out in any of a number of ways. For example, it has been found that such coatings can easily be combined with the cellulose foil if one proceeds as follows:

To the mixture of the condensation product, a synthetic resin and a fatty acid oil, which is dissolved in an organic liquid, there is slowly added, while stirring vigorously a quantity of water so that an emulsion is formed, in which emulsion the water is distributed in very fine particles in solution. Such an emulsion with a very finely dispersed water base is well adapted to thoroughly wet a dry as well as a water moist or wet cellulose foil. The water and glycerine contained in the foil enters into an exchange with the water phase of the emulsion. If now the foil thus wetted is heated to the extent that the water evaporates from the inside towards the outside and subsequently is heated for a short time to the temperature required for the polymerization of the resin mixture, a foil is obtained which possesses a water-repellent coating intimately adhering to it. This coating, which could also be called an impregnation, protects the quantities of water and glycerine contained in the inside of the foil from outside influences.

In this example, Example 1, the ingredients and proportions used are preferably as follows:

| | Parts by weight |
|---|---|
| Urea formaldehyde varnish | 5 |
| Alkyd (75% resin, 25% cocoanut oil) | 15 |
| Butanol | 15 |
| Xylol | 18 |

The ingredients and proportions preferably used for another coating, Example 2, according to the present invention, are:

| | Parts by weight |
|---|---|
| Urea formaldehyde varnish | 3 |
| Glyptal (phtalic anhydrid glycerin resin), about 55% glyceroid, about 45% castor oil | 7 |
| Butanol | 25 |
| Toluol | 65 |

For coatings which must not be particularly soft, one can proceed in the manner that, instead of synthetic resin, a soluble protein-containing substance is added, for instance, albumin, where, however, care must be taken that an excess of formaldehyde is present in the solution mixture, which is moreover the case in most such mixtures.

The polymerization of the coating can also be effected, instead of resorting to a high temperature by a chemical reaction, as for instance by adding boric acid and a mineral acid to the mixture.

When carrying out an example of the latter, Example 3, the ingredients and proportions used are preferably as follows:

| | Parts by weight |
|---|---|
| Urea formaldehyde resin | 30 |
| Alkyd (glyptal with 36% castor oil) | 65 |
| Butanol | 20 |
| Xylol | 60 |
| Water (mixed into the solution) | 325 |

The dry foil in this example is coated with the emulsion, the excess scraped off, and then the foil is led over a drying device and finally heated for three minutes to a temperature of two hundred to three hundred degrees centigrade.

The ingredients and proportions used for still another coating, Example 4, made according to the present invention are:

| | Parts by weight |
|---|---|
| Urea formaldehyde varnish | 2 |
| Resyl (phtalic anhydrid glycerin resin), about 42% glyceroid, about 58% soya bean | 4 |
| Prophylalcohol | 4 |
| Toluol | 60 |
| Water (emulsion) | 30 |

As another example, Example 5, the ingredients and proportions used are preferably as follows:

With an emulsion similar to the latter, a wet cellulose foil still containing approximately 50% water, 7% glycerine and 43% cellulose is soaked and the excess of the emulsion scraped off. The foil impregnated in this manner is now dried slowly on a drying device until the water has so far evaporated that the foil contains only about 12% or less of water. Together with the water, furthermore, the organic solvents will evaporate while the glycerine and the resin remain. In order to make the resin mixture insoluble, the foil is now heated to about two hundred to three hundred degrees centigrade for approximately three to five minutes or to one hundred and eighty to two hundred and thirty degrees centigrade for ten minutes and is then cooled again.

As still another example, the ingredients and proportions used are preferably as follows:

A wet foil is soaked with an emulsion which may consist mainly of the ingredients and proportions specified with regard to the third aforesaid example, with the addition however of 1% boric acid and 0.25 per cent hydrochloric acid or sulfuric acid. The excess in this instance is scraped off and the foil is heated according to Example 5 until the moisture is removed and the foil feels dry.

As already mentioned, the products manufactured in this way display a great resistance to almost any liquid and vapor, especially water, moisture, oils, organic solvents and vapors, and also to weak acids and the like. These products are in addition as soft, pliable and crease resistant as products of regenerated cellulose with the exception, however, that water, moisture and acids can permeate the regenerated cellulose. Other products of regenerated cellulose such for instance as those that are combined with a wax containing coating resist the penetration of moisture but are definitely not waterproof since the coating when the product is submerged in water peels off readily in a few seconds. Such products are furthermore not resistant to organic solvents since they would dissolve the coating. The aforesaid wax-containing products are on the other hand not resistant to the higher temperatures since the wax is only physically mixed with the other contents of the composition. In such latter products, the wax will melt, come to the surface and make such products soft, smeary and sticky.

With products made according to the present invention, the bond is effected through a chemical conversion and consequently the individual, formerly soluble contents cannot thereafter be separated.

I claim:

1. The process of manufacturing water-proof cellulose hydrate strips consisting in coating a sheet of regenerated cellulose with a water repellent layer which is formed by coating with an emulsion of urea formaldehyde resin, alkyd resin, organic solvents, and water, scraping off the excess emulsion, drying the cellulose so coated and finally heating the same for three minutes at a temperature of from two hundred to three hundred degrees centigrade.

2. The process of water-proofing cellulose hydrate strips consisting in coating a sheet of regenerated cellulose containing approximately fifty per cent water, seven per cent glycerine and forty-three per cent cellulose with a water repellent layer, which is formed by coating with an emulsion of urea formaldehyde resin, alkyd resin, organic solvents, and water, scraping off the excess emulsion, slowly drying the so coated sheet until the water content has been evaporated to twelve per cent or less and the organic solvents substantially removed, and thereupon heating the resulting product for about three to five minutes at a temperature of from two hundred to three hundred degrees centigrade to form an insoluble coating.

3. The process of water-proofing cellulose hydrate strips consisting in coating a sheet of regenerated cellulose containing approximately fifty per cent water, seven per cent glycerine and forty-three per cent cellulose with a water repellent layer, which is formed by coating with an emulsion of urea formaldehyde resin, alkyd resin, organic solvents and water, scraping off the excess emulsion, slowly drying the so coated sheet until the water content has been evaporated to twelve per cent or less and the organic solvents substantially removed, and thereupon heating the resulting product for about ten minutes at a temperature of from one hundred and eighty to two hundred and thirty degrees centigrade to form an insoluble coating.

4. The process of manufacturing waterproof cellulose hydrate sheets comprising coating a sheet of wet regenerated cellulose with a water repellent layer, which is formed by coating with an emulsion of urea formaldehyde resin, alkyd resin, organic solvents and water, boric acid and hydrochloric acid, scraping off the excess of the emulsion, and then heating the same until the moisture is removed and the resulting strip is dry and the urea formaldehyde resin and alkyd resin have been converted into a resinous polymerized compound.

5. The process of manufacturing waterproof cellulose hydrate sheets comprising coating a sheet of wet regenerated cellulose with a water repellent layer, which is formed by coating with an aqueous emulsion containing as the resin content urea formaldehyde resin and alkyd resin, then heating to a temperature of 200° to 300° C. for about three minutes the so coated product to form a coating which comprises a homogeneous converted resinous polymerized compound of a predetermined mixture of urea formaldehyde and alkyd resin which is insoluble in water, oil, organic solvents and the like and which adheres firmly to the regenerated cellulose.

6. The process of manufacturing transparent, flexible and waterproof cellulose hydrate strips comprising coating a sheet of regenerated cellulose having a water and glycerine content with a water repellent layer comprising an aqueous emulsion of urea formaldehyde resin, alkyd resin and organic solvents, thereupon drying the coating when an exchange of water and glycerine between the sheet and the coating occurs to advance the formation of an intimate bond and subsequently heating the cellulose sheet so coated at a uniformly maintained high temperature for a sustained period of time to convert the coating into an insoluble polymerized resinous compound intimately bonded to the structure.

7. A transparent, flexible and pliable sheet proof against water, organic solvents and mineral and vegetable oils, comprising a cellulose hydrate structure having a water and glycerine content combined with a polymerized heat converted resinous coating, said coating formed by spreading an aqueous emulsion of urea formaldehyde resin and alkyd resin upon the structure, bonded to the structure by drying when an exchange of water and glycerine between the structure and the coating occurs, and converted into an insoluble polymerized resinous compound at an increase in temperature uniform throughout the coating for a sustained period of time.

8. A transparent, flexible and pliable sheet proof against water, organic solvents and mineral and vegetable oils, comprising a cellulose hydrate structure having a water and glycerine content combined with a polymerized heat converted resinous coating, said coating formed by spreading an aqueous emulsion of urea formaldehyde resin and alkyd resin upon the structure, bonded to the structure by drying when an exchange of water and glycerine between the structure and the coating occurs, and converted into an insoluble polymerized resinous compound at a temperature of 200° to 300° centigrade uniform throughout the coating for about three minutes.

EMIL CZAPEK.